United States Patent [19]

Hore et al.

[11] Patent Number: 5,764,127

[45] Date of Patent: Jun. 9, 1998

[54] INDUCTIVE TRANSMITTERS FOR CONDUCTOR LOCATION

[75] Inventors: Donald Lionel Hore, Stoke Bishop; Alan John Hopkin, Bradley Stoke, both of Great Britain

[73] Assignee: Radiodetection Limited, Bristol, England

[21] Appl. No.: 616,202

[22] Filed: Mar. 15, 1996

[30] Foreign Application Priority Data

Mar. 17, 1995 [GB] United Kingdom .................. 9505382

[51] Int. Cl.⁶ ........................................................ H01F 29/02
[52] U.S. Cl. ..................... 336/143; 336/147; 336/181; 336/184; 324/345
[58] Field of Search ............................... 336/143, 145, 336/147, 180, 181, 184; 324/345

[56] References Cited

U.S. PATENT DOCUMENTS

| | | | |
|---|---|---|---|
| 2,161,635 | 6/1939 | Prokopenko | 177/311 |
| 2,934,698 | 4/1960 | Longland | 324/41 |
| 3,662,576 | 5/1972 | Girlatschek | 72/21 |
| 3,860,897 | 1/1975 | Kuszleyko | 336/147 |
| 4,112,349 | 9/1978 | Weber | 324/3 |
| 4,686,454 | 8/1987 | Pecukonis | 324/67 |
| 4,993,325 | 2/1991 | Slone | 324/345 |
| 5,554,934 | 9/1996 | Ward et al. | 324/345 |
| 5,578,926 | 11/1996 | Reinhardt | 324/345 |
| 5,650,726 | 7/1997 | Gasnier et al. | 336/147 |

FOREIGN PATENT DOCUMENTS 1509914  5/1978  United Kingdom .......... G01D 21/04

*Primary Examiner*—Jeffrey L. Sterrett
*Attorney, Agent, or Firm*—Larson & Taylor

[57] ABSTRACT

Two vertical, parallel, horizontally spaced signal coils are connected in series but in opposite phase across an a.c. source. Thus a buried conductor located centrally beneath the coils experiences an alternating magnetic field whose strength is due to the addition of the fields induced by the two coils. The field strength may be further enhanced by one or more of: providing a ferromagnetic flux diverter between the upper ends of the coils; placing a conductive nonmagnetic screen between them; connecting a tuning capacitor in parallel with the coils; or providing a tuning circuit having series-connected secondary coils which are flux-linked to respective signal coils and are in parallel with a capacitor. There may be a switch arrangement for switching the signal coils to in-phase connection, for use when they are oriented horizontally.

11 Claims, 7 Drawing Sheets

5,764,127

INDUCTIVE TRANSMITTERS FOR CONDUCTOR LOCATION

BACKGROUND OF THE INVENTION

Location of conductors (particularly buried conductors), e.g. metallic pipes and cables, is conventionally achieved by detecting alternating magnetic fields resulting from current flow along the conductors. Such flow may be the result of ground currents from power or radio sources. But for true identification and tracing of specific buried lines, it is often necessary to impose a known signal of controlled frequency onto the conductor. This may be achieved in various ways, e.g. by direct electrical connection of a signal transmitter, by transformer coupling of the transmitter by a toroidal clamp to obviate the need for an electrical connection, or by utilising the transmitter's own magnetic field to induce a signal in the conductor. It is to improving the capabilities of this last mode of operation that this invention is directed.

FIG. 1 shows the basic principle of conventional induction methods. A transmitter coil 1 is fed with a.c. at a specific frequency. Thus it produces a magnetic field which links it to a conductor 3 below, to induce a voltage therein. (The conductor 3 must not be parallel to the coil 1, and is preferably substantially perpendicular to it.) This will cause signal current flow in the conductor if there is adequate coupling to ground, e.g. by capacitance, earth bonds, or both. The field resulting from this signal current may then be located with a suitable receiver, which may be of a type exemplified by patent GB1,509,914, thereby enabling location of the conductor. Note that it is the horizontal component of the field from the coil which induces the maximum signal in the conductor when the coil is directly above and horizontally orthogonal in orientation relative to the line of the conductor 3. (More generally, it is the component parallel to the coil itself, when the coil extends transversely to the conductor and is symmetrically disposed relative to it.) The available field may be increased by providing the coil with a core 2 of high permeability material such as ferrite.

SUMMARY OF THE INVENTION

Thus the invention provides an inductive transmitter for conductor location comprising a pair of coils spaced apart in side-by-side relationship with their axes having at least substantial components in parallel; and means for passing an a.c. signal through both coils with opposite phases so that if a conductor extends transversely to them between their axes and axially spaced from them, it experiences additive magnetic fields from the two coils which tend to induce a signal current in it. Preferably ferromagnetic material is provided adjacent the ends of the two coils which, in use, are further from the conductor, said material extending substantially between those ends, to provide a flux path linking them.

A screen of electrically conductive nonmagnetic material may be placed between the coils.

Preferably means are provided for selectively passing an a.c. signal through the coils either in phase or with opposite phases. This may employ a simple switching arrangement with a pair of switches for reversing the connection of one coil.

The two coils may be connected in series across an a.c. source. They are preferably in parallel with a capacitor which may be selected so that a relatively large field is produced. Alternatively there may be a pair of secondary coils coupled to the primary coils, with a tuning capacitor connected across them. By selecting a suitable turns ratio for the primary and secondary coils, a much smaller capacitor may be employed. (If the phase relationships of the primary coils is switchable, so is that of the secondary coils.)

DESCRIPTION OF THE PREFERRED EMBODIMENTS

Figure 1:
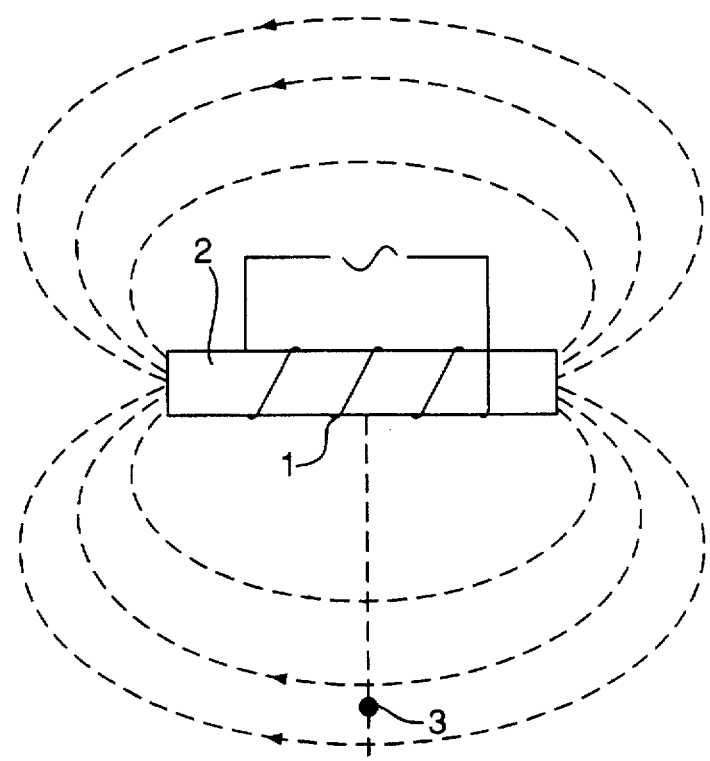
FIG. 1 is a schematic view of a conventional transmitter employing one horizontal coil.
Figure 2:
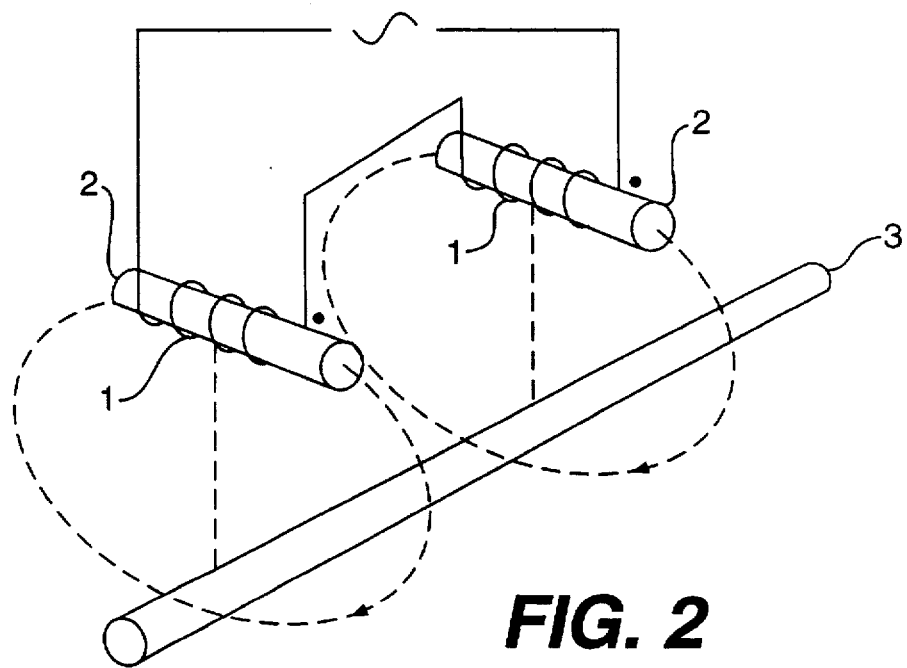
FIG. 2 is a like view showing a transmitter with two horizontal coils.

The prior art device shown in FIG. 1 and described above uses a single (horizontal) coil to induce a signal in a (horizontal) conductor. In theory, the signal strength could be increased by using plural signal coils. Thus FIG. 2 shows two transmitter coils 1, each like that of FIG. 1, having a ferrite core 2, disposed parallel to each other above and across the buried conductor. The coils are so connected that their currents are in phase with each other, as indicated. It will be apparent that, if connected antiphase, their magnetic fields would tend to cancel each other out, and so reduce the induction effect.

Figure 3:
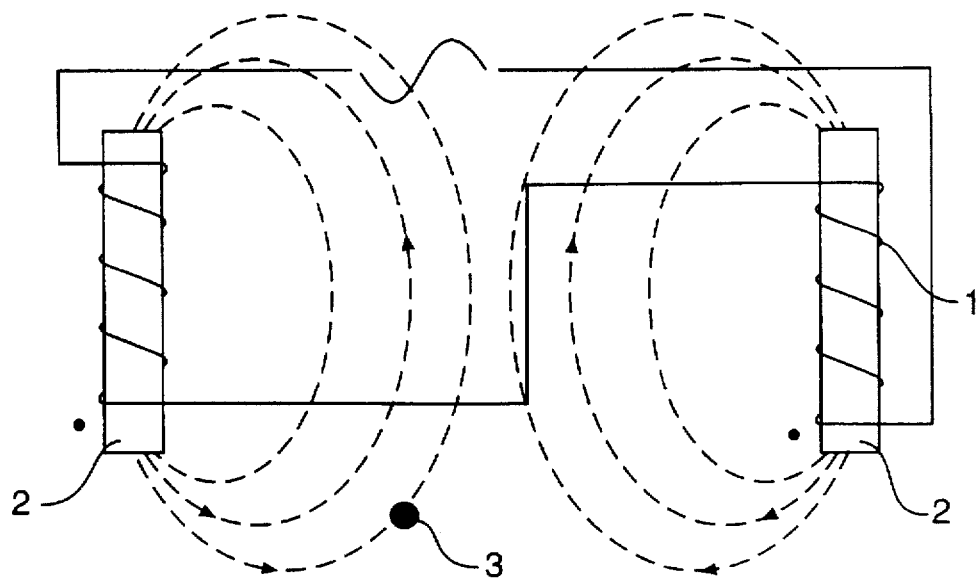
FIGS. 3 and 4 show transmitters having two vertically extending coils connected in phase and antiphase respectively.
Figure 4:
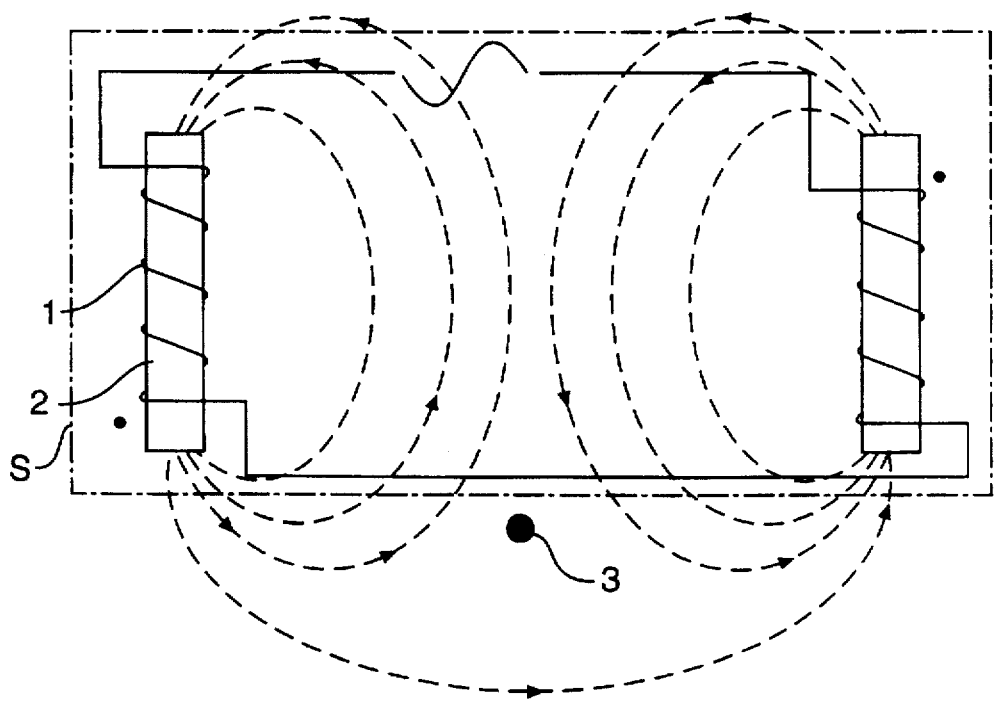

Now consider two such coils arranged vertically either side of the line of the conductor as shown in FIG. 3. If connected in phase as shown, it will be apparent that, while the vertical components of their fields between the coils are additive, the horizontal components on which reliance is placed for signal induction are subtractive from each other, and will therefore cancel out when the line 3 is centrally below the coil pair. However, if they are reconnected antiphase as shown in FIG. 4, the horizontal components are additive, to give maximum induction when the line is central. This is the principle of the present invention. FIG. 4 also shows schematically the support structure S to which the coils (and, generally, electrical circuitry and components) are mounted. The support structure will generally be designed so that it can be carried and/or stood on the ground with the coils in the intended orientation (which is generally vertical).

Note that, in all the illustrations, there will be magnetic field leakage above and around the coil or coils. It is only the leakage field extending to the conductor 3 which is useful for induction, the remainder being only of nuisance value in producing unwanted interference. It would therefore be advantageous to enable this unwanted leakage field to be minimised, by giving the transmitter improved directionality.

Figure 5:
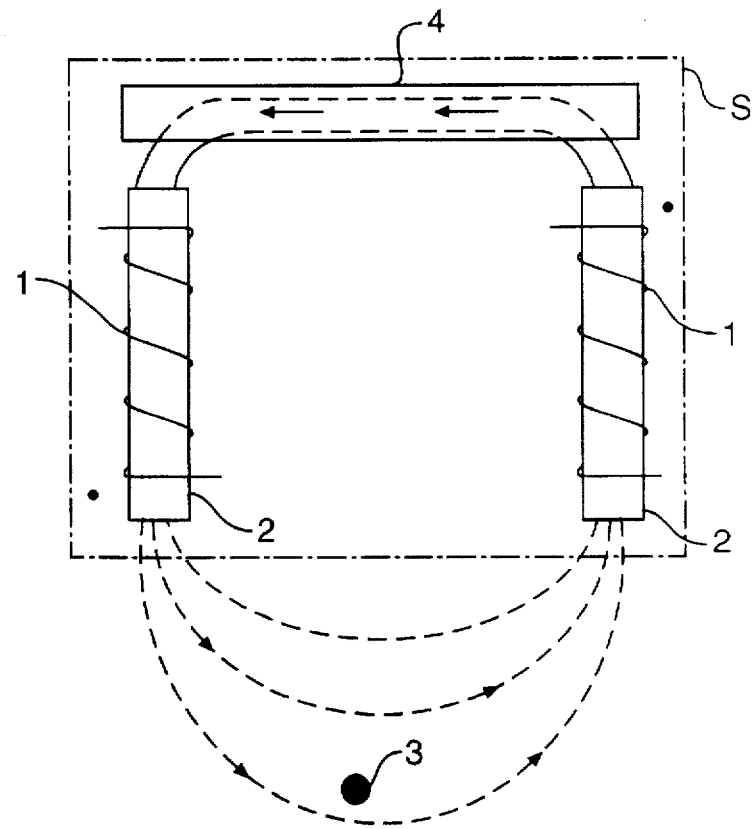
FIG. 5 shows the FIG. 4 arrangement with the addition of a ferromagnetic diverter.

FIG. 5 shows how this may be achieved. The antiphase coil arrangement is as in FIG. 4, but a rod, bar or sheet of ferromagnetic material 4 is added and disposed horizontally above and between the coils. Because of its high permeability, leakage flux is diverted through the material 4 rather than surrounding space, so that the unwanted electromagnetic radiation above and around the transmitter is substantially reduced. FIG. 5 also shows the support structure S.

Figure 6:
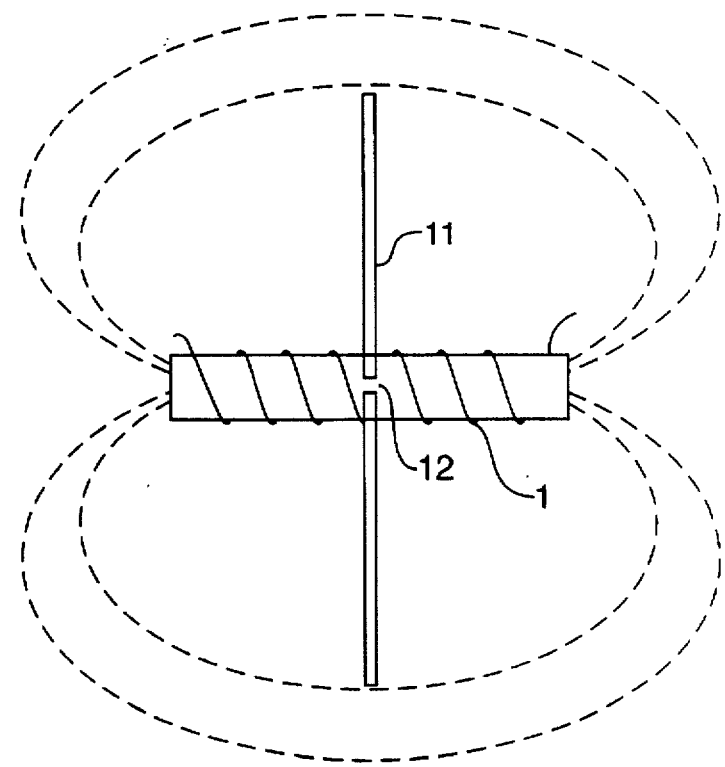
FIG. 6 is a diagram showing a single transmitting coil with a screen.

An additional and effective method of enhancing the field in the required direction is the use of near-field screening of the transmitter. The principle is illustrated in FIG. 6 in relation to a simple transmitting aerial as in FIG. 1, but around which has been placed centrally and perpendicular to the coil axis a sheet or disc 11 of non-magnetic conductor such as copper or aluminium, cut at 12 so as to present an incomplete turn around the coil. (A complete turn would act as a short-circuited secondary winding, and so tend to cancel out the flux.) If required, sheet 11 may comprise conducting layers insulated from each other, with cuts 12 overlapped by adjoining layers.

Figure 7:
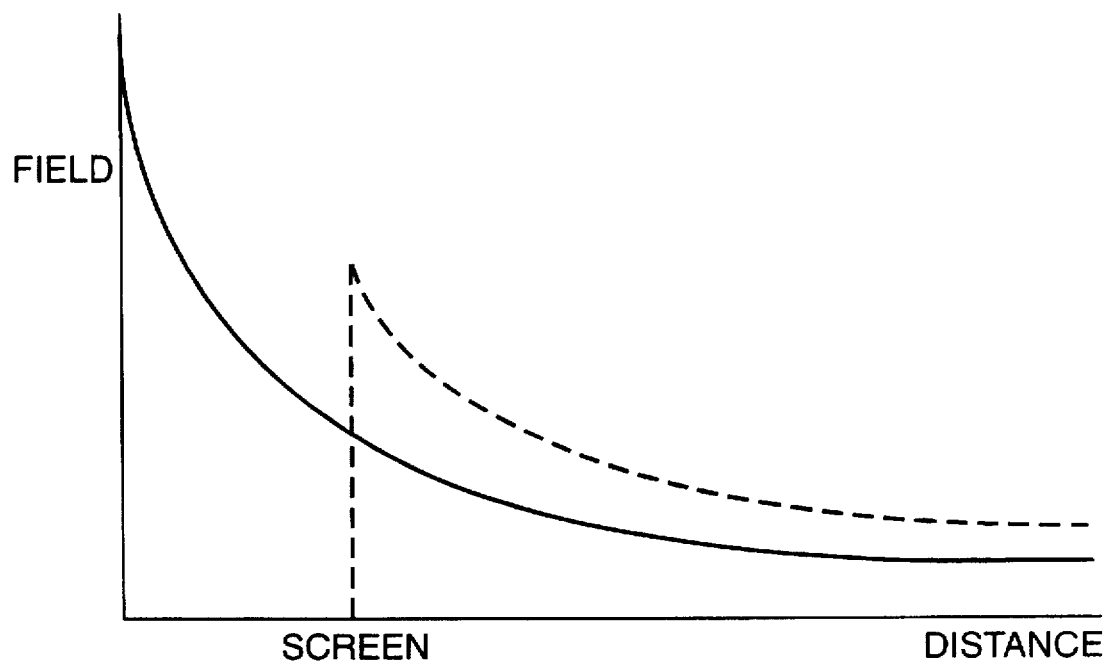
FIG. 7 is a graph showing the effect of the screen on the field distribution.

The magnetic flux developed by coil 1 leaks through the air path surrounding it, to produce the highest flux density immediately outside the coil. This path is now obstructed by screen 11, in which circulating currents are induced by the alternating flux to oppose its passage. The shortest flux path is therefore lengthened by the screen, to change the field gradient in the vicinity of the coil 1. FIG. 7 shows the effect; the solid curve represents the decay of the field with distance from the unscreened aerial, with a steep gradient initially. The broken line shows the effect of near-field screen 11; because the shortest flux path has been lengthened, the gradient is reduced, and the area under the original curve between coil and screen is now added to the far field, with significant increase in induction at a distance.

Figure 8:
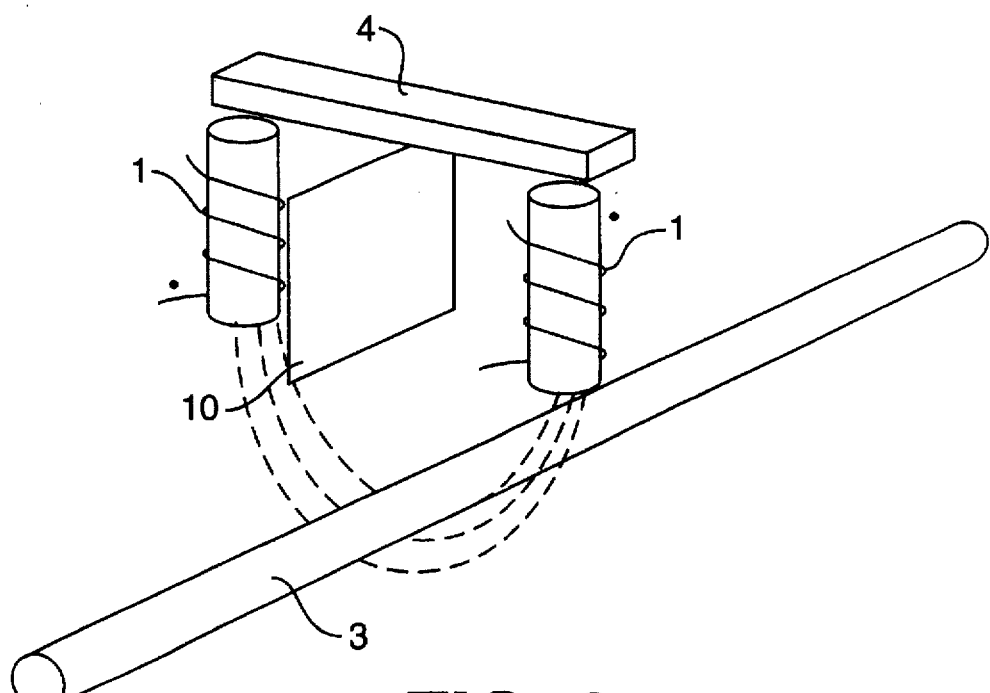
FIG. 8 shows the FIG. 5 arrangement with the addition of a conductive nonmagnetic screen between the coils.

FIG. 8 shows this principle applied beneficially to the transmitter concept which is the subject of this application. With two parallel aerial coils antiphase connected, the principal flux leakage path is between their ends, because they are of opposite polarity. By simply interposing a screen 10 of non-magnetic conductor, this close leakage path is blocked, to produce the change in field gradient already described in relation to FIGS. 6 and 7. With ferromagnetic diverter 4 positioned as shown above the coils, the inter-coil leakage is primarily across the lower ends, so producing additional field enhancement in the required direction when obstructed by screen 10.

Figure 9:
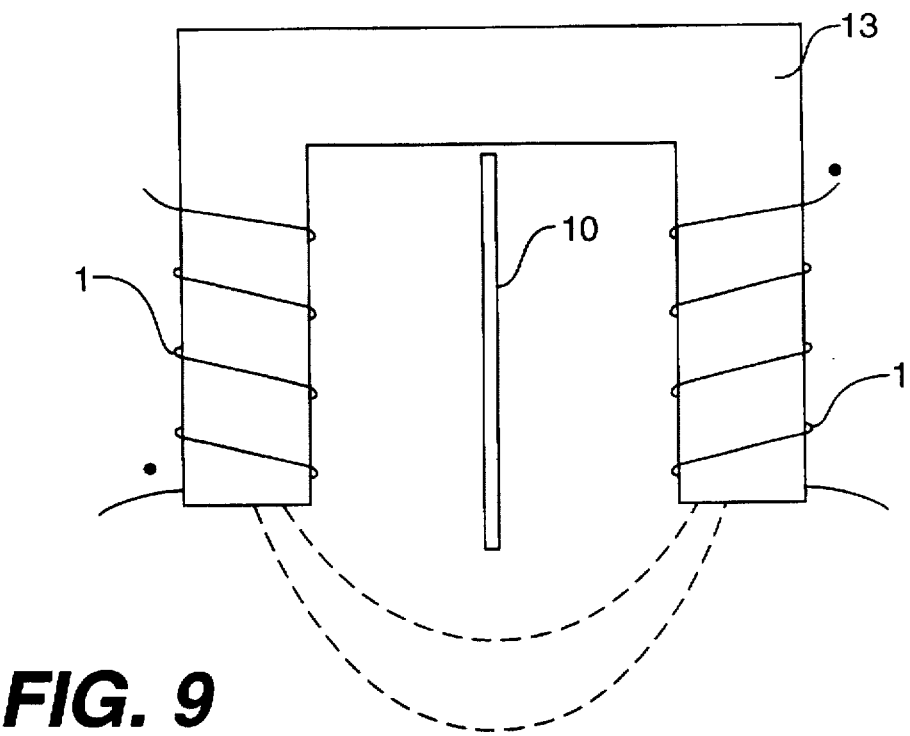
FIG. 9 shows a simplified version of the FIG. 8 assembly.

An obvious alternative to the separate cores 2 and diverter 4 is the use of a single C-core 13 of ferrite or similar ferromagnetic material, with coils 1 on each leg, and screen 10 between them, as shown in FIG. 9.

Figure 10:
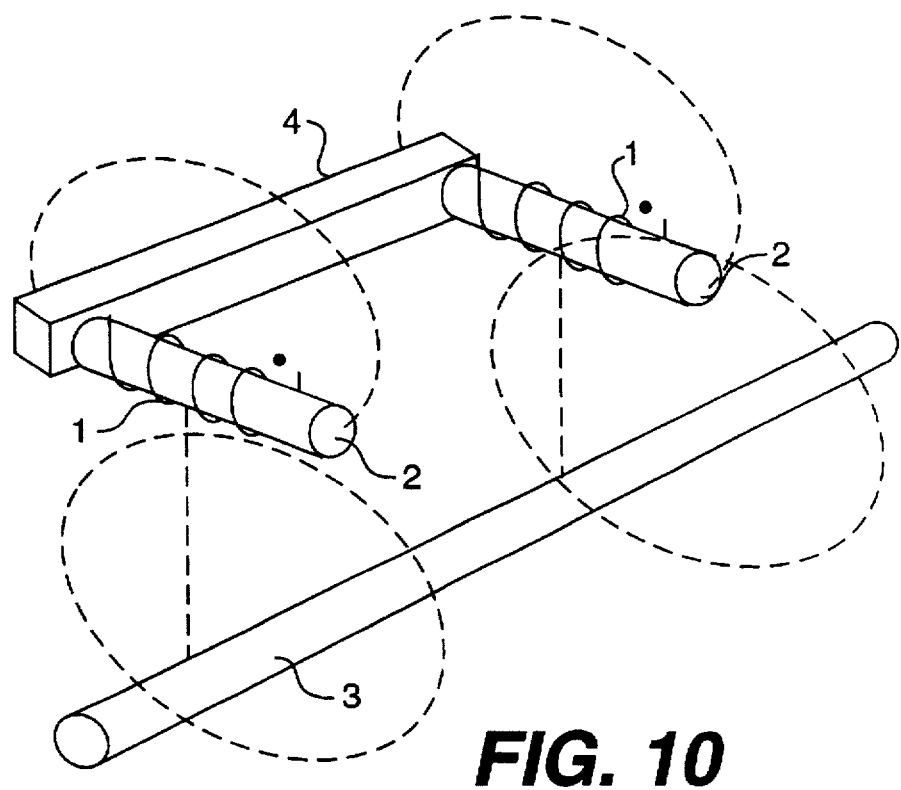
FIG. 10 shows the adaptation of the FIG. 5 device to horizontal orientation of the coils.

However, there are some situations in which the FIG. 2 induction arrangement may be advantageous. It may therefore be desired to provide in a single transmitter either option. FIG. 10 shows the arrangement of FIG. 5 turned on its side, so that the coils are oriented relative to line as in FIG. 2. The ferromagnetic diverter now links one side of the coil pair, which would now be ineffective for induction if still connected antiphase, as pointed out above with reference to FIG. 2. By reconnecting them in phase, maximum induction is achieved, and the ferromagnetic diverter has no effect, because it links coil ends of the same magnetic polarity. For the same reason, insertion of a screen 10 as shown and described relative to FIG. 8 has no effect in this orientation with in-phase connection.

Figure 11:
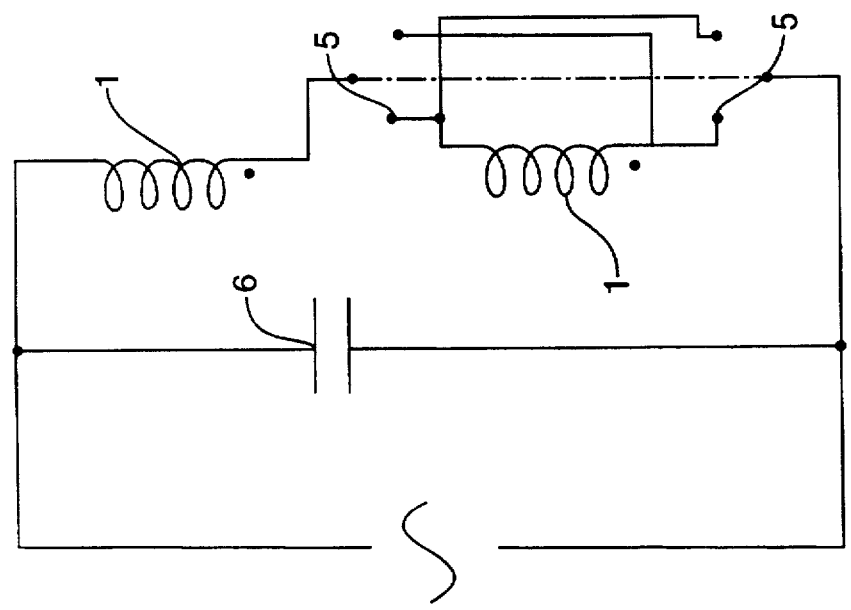

FIG. 11 indicates diagrammatically how the coil connection options may be provided. The pair of coils are connected to the a.c. supply via a pair of changeover switches, mechanically or electronically synchronised to change over together. When in the position shown, the two coils are connected in series in phase to suit the FIG. 10 application. When changed over, the switches connect the coils in series antiphase, to suit the FIG. 8 application.

In order to optimise the induction field produced by the excitation current, resonance tuning at the specific frequency is provided by a parallel capacitor.

Figure 12:
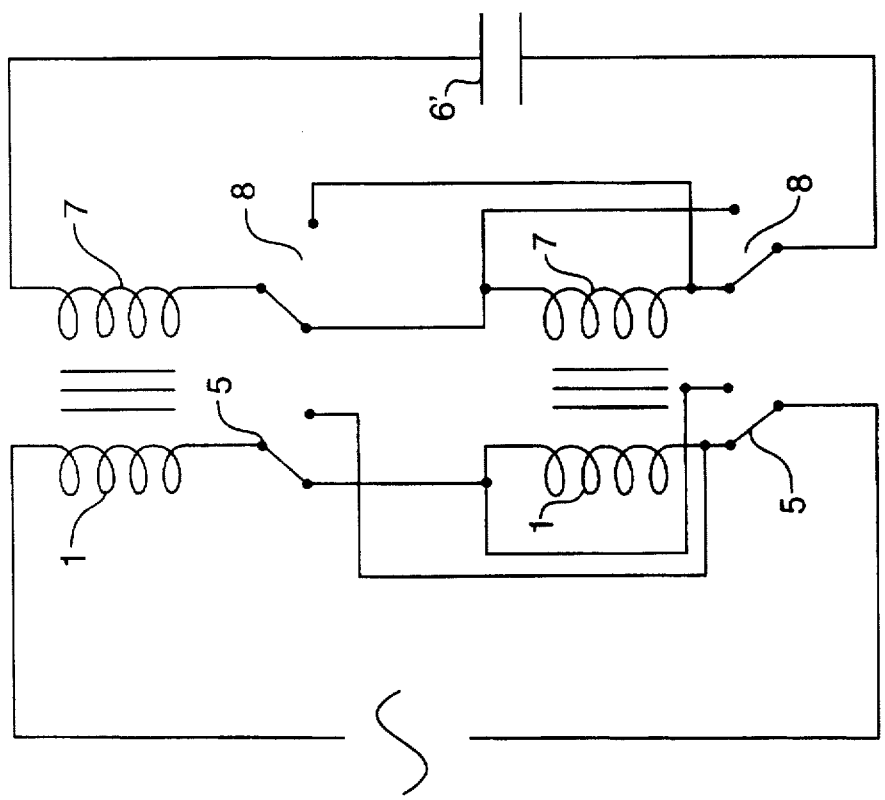
FIGS. 11 and 12 show alternative coil connection circuits.

An alternative arrangement, which gives much greater choice of tuning capacitor for production or purchasing convenience, is shown in FIG. 12. Here the coils are primary coils and are coupled to secondary coils. The turns ratio between primary and secondary coils can be chosen to minimise tuning capacitor cost, the capacitor 6' now being across the secondary side. By adopting a high turns ratio, e.g. 1:20, between primary and secondary coils, a much smaller and cheaper capacitor may be utilised, with increased choice of capacitance value, so offsetting the additional cost of secondary windings and switches 8 (which are duplicated for the secondary coils in synchronism with the switches for the primary circuit).

Figure 13A:
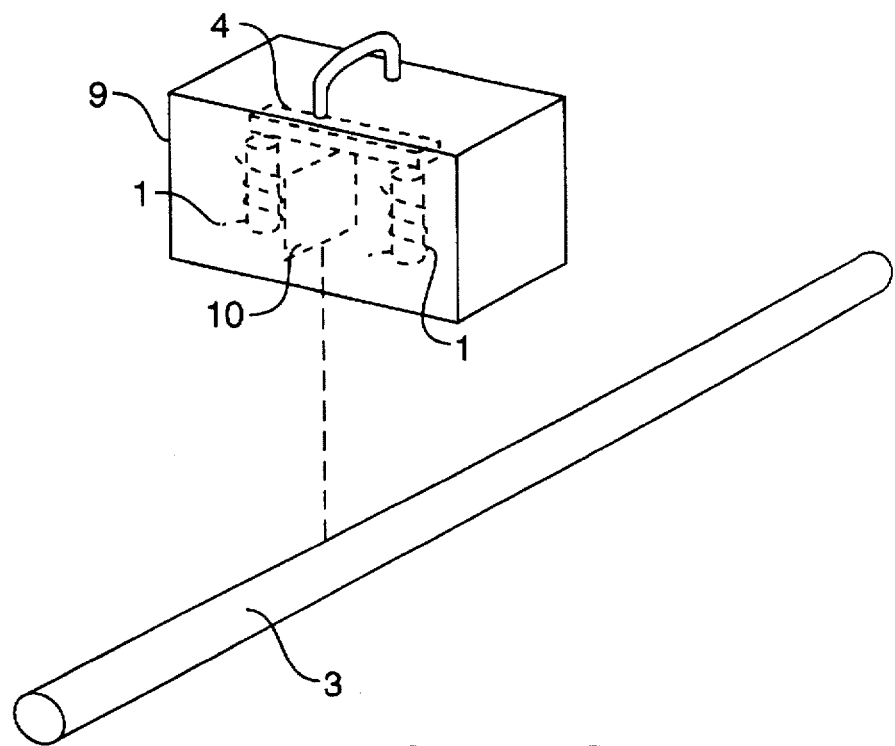
FIGS. 13A and 13B show a practical embodiment employing a transmitter as shown in FIG. 8, FIGS. 13A and 13B showing the device oriented with its coils vertical and horizontal respectively.
Figure 13B:
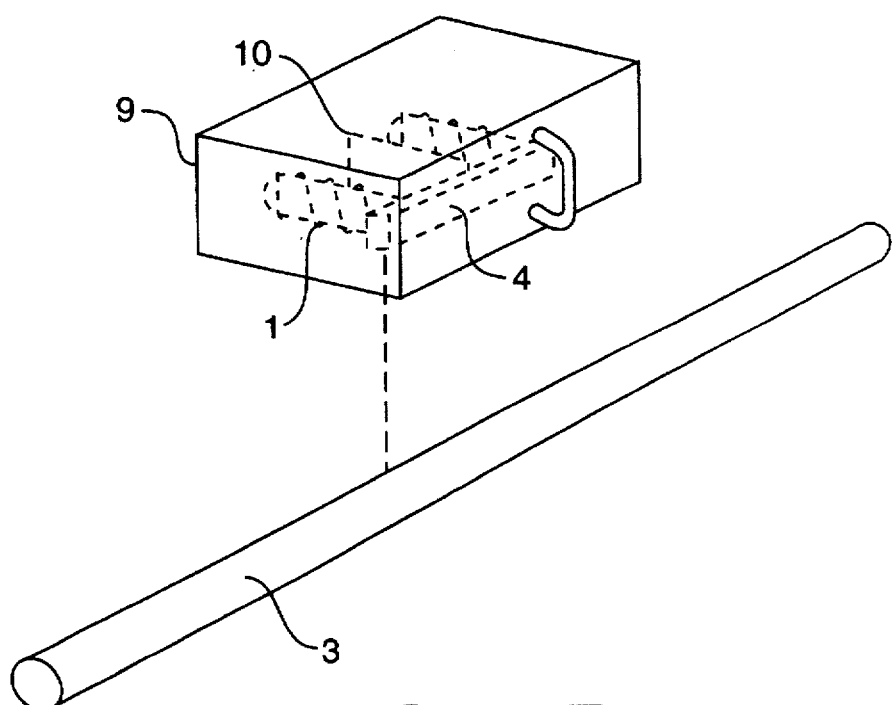

A practical embodiment of the invention is shown in FIG. 13. A portable transmitter housing incorporates the transmitter coils and ferromagnetic parts in the configuration already described for FIGS. 5 and 10. A screen 10 as shown in FIG. 8 is also included. The transmitter excitation a.c. may be provided by a separate supply, or by integral battery-powered electronics. The housing will also incorporate any control switches or output adjustments as required. It will be apparent that such a transmitter may be positioned above the target conductor with the transmitter coils vertical, to reproduce the FIG. 5 arrangement, in which case the controls would be set to give antiphase excitation, or with them horizontal to give the FIG. 10 arrangement, with the controls set for in-phase excitation. Because change from one to the other involves 90° change of vertical axis, a gravity sensing device such as a mercury switch may be incorporated to reverse the excitation automatically if required.

An alternative way of utilising the transmitter embodiment of FIG. 13A is to use the switching from antiphase to in-phase coil connection while maintaining the same orientation to ground. The result is then effectively a single vertical transmitting aerial, which can be used to induce a signal in any buried conductors in the vicinity unless directly below, in which case a null signal results.

Whereas the invention has been described and illustrated with reference to certain preferred embodiments, the skilled reader will appreciate that many modifications and variations are possible within the spirit and scope of the invention. It is intended to include all such modifications and variations within the scope of the appended claims.

We claim:

1. An inductive transmitter for inducing a signal in a conductor comprising:
   support structure;
   a pair of signal coils mounted on said support structure, each of said signal coils having a coil axis; said signal coils being laterally spaced apart and mounted so that their axes are substantially parallel and substantially in the same plane;

an a.c. source; and connecting means connecting said a.c. source to said signal coils so that said signal coils are connected to said a.c. source in opposite phases, whereby when the transmitter is located relative to a said conductor so that the conductor extends between said axes of said signal coils and intersects said plane, and said a.c. source passes a current through said signal coils, then the conductor experiences an additive alternating magnetic field due to the two signal coils, which field tends to induce a signal current to flow in said conductor.

2. An inductive transmitter according to claim 1 wherein each of said signal coils has a first end which in use is closer to the conductor and a second end which in use is remoter from the conductor, and said inductive transmitter includes a flux diverter of ferromagnetic material which is located adjacent said second ends of the two signal coils and extends substantially between them to provide a magnetic flux path linking said second ends.

3. An inductive transmitter according to claim 2 which includes a U-shaped ferromagnetic core having two limbs connected by a bridge portion, and wherein said signal coils are wound on respective ones of said limbs, and said bridge portion constitutes said flux diverter.

4. An inductive transmitter according to claim 1, further including a screen of electrically conductive nonmagnetic material located between said signal coils.

5. An inductive transmitter according to claim 1 wherein said connecting means includes means connecting said signal coils in series across said a.c. source, and a capacitor connected in parallel across said signal coils.

6. An inductive transmitter according to claim 1 wherein each said signal coil constitutes the primary coil of a respective transformer which further includes a respective secondary coil; the secondary coils of said transformers being connected in series in opposite phases; said inductive transmitter further including a tuning capacitor which is connected in parallel across said secondary coils.

7. A method of inducing a signal in a conductor comprising providing a pair of signal coils, each having a respective coil axis, and disposing the signal coils so that they are laterally spaced apart with their axes substantially parallel and substantially in the same plane, and the conductor extends between said axes and intersects said plane; and applying an a.c. signal to said two coils in opposite phases, whereby said conductor experiences an additive alternating magnetic field due to the two signal coils, which field induces a signal current to flow in said conductor.

8. An inductive transmitter for inducing a signal in a conductor comprising:

a support structure;

a pair of signal coils mounted on said support structure, each of said signal coils having a coil axis; said signal coils being laterally spaced apart and mounted so that their axes are substantially parallel and substantially in the same plane;

an a.c. source; and connecting means connecting said a.c. source to said signal coils and including a switching assembly for selectively altering the mode of connection of the coils between opposite phase connection and same phase connection; whereby when said switch assembly connects said signal coils to said a.c. source in opposite phases, and said transmitter is located relative to a said conductor so that the conductor extends between said axes of said signal coils and intersects said plane; and said a.c. source passes a current through said signal coils, then the conductor experiences an additive alternating magnetic field due to the two signal coils, which field tends to induce a signal current to flow in said conductor.

9. An inductive transmitter according to claim 8 wherein said support means is adapted to support said signal coils selectively in either of two orthogonal configurations: with said axes substantially vertical, for use with said opposite phase connection; and with said axes substantially horizontal and horizontally spaced, for use with said same phase connection.

10. An inductive transmitter for inducing a signal in a conductor comprising:

a support structure;

a pair of transformers, each having a respective primary coil and a respective secondary coil;

said primary coils constituting signal coils and being mounted on said support structure, each of said signal coils having a coil axis; said signal coils being laterally spaced apart and mounted so that their axes are substantially parallel and substantially in the same plane;

a tuning capacitor which is connected in parallel across said secondary coils;

an a.c. source; and connecting means connecting said a.c. source to said signal coils; and a switching assembly for selectively connecting said signal coil together and said secondary coils together such that in a first state of said switching assembly, said signal coils are connected in opposite phase and said secondary coils are connected in opposite phase, and, in a second state of said switching assembly, said signal coils are in same phase connection and said secondary coils are in same phase connection; whereby when said switching assembly connects said signal coils to said a.c. source in opposite phase, and said transmitter is located relative to a said conductor so that the conductor extends between said axes of said signal coils and intersects said plane, and said a.c. source passes a current through said signal coils, then the conductor experiences an additive alternating magnetic field due to the two signal coils, which field tends to induce a signal current to flow in said conductor.

11. An inductive transmitter according to claim 10 wherein said support means is adapted to support said signal coil selectively in either of two orthogonal configurations: with said axes substantially vertical, for use with said opposite phase connection; and with said axes substantially horizontal and horizontally spaced, for use with said same phase connection.

* * * * *